United States Patent [19]

Morita

[11] Patent Number: 4,796,497
[45] Date of Patent: Jan. 10, 1989

[54] METHOD AND APPARATUS FOR CUTTING A CHAIN OF ELONGATE PRODUCTS

[75] Inventor: Toyoo Morita, Uozu, Japan

[73] Assignee: Yoshida Kogyo K. K., Tokyo, Japan

[21] Appl. No.: 946,210

[22] Filed: Dec. 24, 1986

[30] Foreign Application Priority Data

Dec. 25, 1985 [JP] Japan .................. 60-296419

[51] Int. Cl.$^4$ .................................. B65H 35/06
[52] U.S. Cl. .................................. 83/23; 83/42; 83/71; 83/167; 83/210; 83/363; 83/365; 83/367; 83/371
[58] Field of Search .................. 83/23, 42, 71, 167, 83/363, 365, 367, 371, 288, 210

[56] References Cited

U.S. PATENT DOCUMENTS

| | | | |
|---|---|---|---|
| 3,425,306 | 2/1969 | Wetzler | 83/371 X |
| 3,723,122 | 3/1973 | Yano et al. | 83/371 X |
| 4,026,172 | 5/1977 | Off et al. | 83/371 X |
| 4,070,937 | 1/1978 | Off et al. | 83/371 X |
| 4,224,849 | 9/1980 | Loser | 83/371 X |
| 4,596,172 | 6/1986 | Visser | 83/71 |

*Primary Examiner*—Frank T. Yost
*Attorney, Agent, or Firm*—Hill, Van Santen, Steadman & Simpson

[57] ABSTRACT

In a method and apparatus for cutting a chain of longitudinally joined elongate products into pieces of a desired length, the chain of elongate products is intermittently fed by a feed unit through a first distance equal to the length of each piece to be severed, along a path through a detector and a cutting unit downstream of the detector and the chain is cut successively into pieces of the desired length at the cutting unit while the feed unit is inoperative. As the chain is advanced, the joint portion of each adjacent pair of the elongate products is detected by the detector. Upon detection of the joint portion, a control unit computes the number of prospective pieces of the desired length producible by severing from a longitudinal portion of the chain which extends from the present leading end of the chain toward the detected joint portion and terminates short of the detected joint portion. When the computed number of pieces have been severed, the chain is advanced by a second distance until the detected joint portion is located downstream of the cutting unit. The chain is cut to produce a severed piece including the detected joint portion which is received in a reciporcably movable container.

8 Claims, 4 Drawing Sheets

METHOD AND APPARATUS FOR CUTTING A CHAIN OF ELONGATE PRODUCTS

BACKGROUND OF THE INVENTION

1. Field of the Invention:

The present invention relates generally to the cutting of an elongate material such as a surface fastener, a slide fastener chain, an ornamental tape, or an elongate piece of cloth, and more particularly to a method and apparatus for cutting a chain of longitudinally joined elongate materials into pieces of a desired length.

2. Prior Art:

In general, elongate products such as surface fasteners, slide fastener chains, ornamental tapes, or elongate pieces, of cloth are stored and processed in the form of a chain composed of a series of such elongate products joined end to end. For the production of pieces of a desired length from the chain, it is customary to feed the chain stepwise along a path by an intermittently operative feed unit and then to sever the chain successively into pieces of the desired length by a cutting unit while the feed unit is inoperative. This synchronous operation of the feed unit with the cutting unit is interrupted each time a joint portion between two adjacent elongate products arrives at a detector disposed on the path. Upon detection of the joint portion, the chain is pulled forwardly by an operator until the detected joint portion is located downstream of the cutting unit which is then operated to remove a piece including the joint portion. Thereafter, the feed and cutting units resume their synchronous operation.

Due to the frequent interruption of the synchronous feeding and cutting operation and also due to the manual chain feeding, the aforesaid conventional practice is ineffective, low in productivity, laborious and time-comsuming. With the manual chain feeding, the severed pieces having the joint portions tend to have non-uniform lengths which would increase a loss of material.

SUMMARY OF THE INVENTION

It is accordingly an object of the present invention to provide a method and apparatus for automatically cutting a chain of longitudinally joined elongate products successively into pieces of a desired length at an increased rate of production without causing an objectionable interruption of the operation.

According to the present invention, there are provided a method and apparatus for cutting a chain of longitudinally joined elongate products into pieces of a desired length, wherein the chain of elongate products is intermittently fed by a feed unit through a first distance equal to the length of each piece to be severed, along a path through a detector and a cutting unit downstream of the detector and the chain is cut successively into pieces of the desired length at the cutting unit while the feed unit is inoperative. As the chain is advanced, the joint portion of each adjacent pair of the elongate products is detected by the detector. Upon detection of the joint portion, a control unit computes the number of prospective pieces of the desired length producible by severing from a longitudinal portion of the chain which extends from the present leading end of the chain toward the detected joint portion and terminates short of the detected joint portion. When the computed number of pieces have been severed, the chain is advanced by a second distance until the detected joint portion is located downstream of the cutting unit. The chain is cut to produce a severed piece including the detected joint portion which is received in a reciprocably movable container.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

Figure 1:
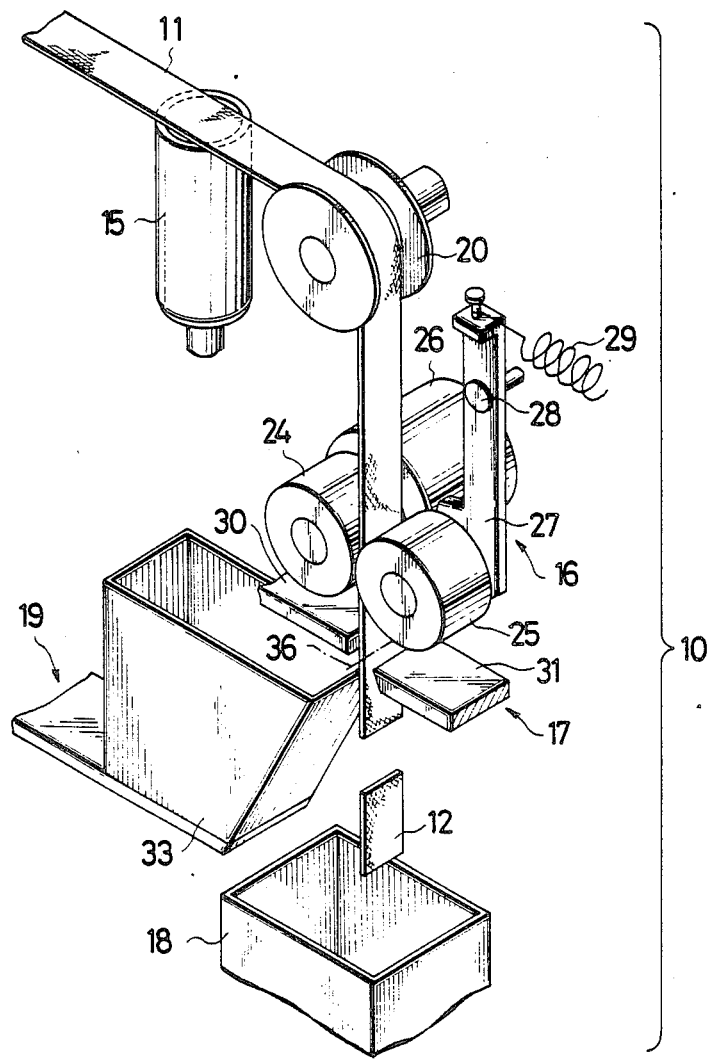
FIG. 1 is a schematic perspective view of an apparatus for cutting a chain of longitudinally joined elongate according to the present invention.
Figure 2:
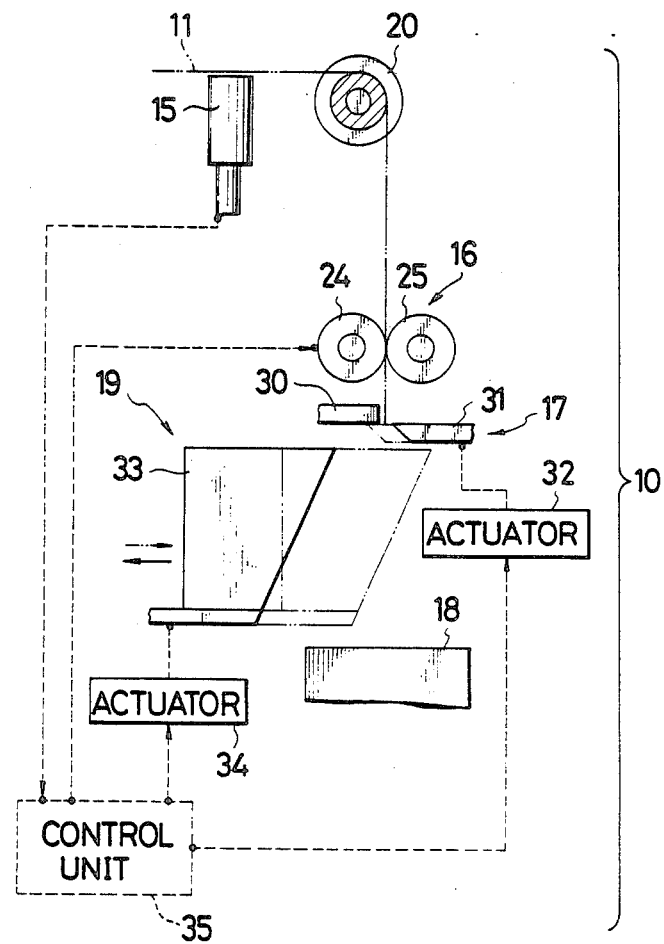
FIG. 2 a diagrammatical view illustrative of the operative connection between various parts of the apparatus shown in FIG. 1.

FIGS. 1 and 2 show an apparatus 10 for automatically cutting a chain of elongate products 11 successively into pieces 12 of a desired length 1. As shown in FIGS. 3A through 3D, the elongate products 11 are joined end to end with joint portions 13 disposed therebetween. Each of the joint portions 13 includes three staples 14 of metal interconnecting an adjacent pair of the elongate products 11.

As shown in FIGS. 1 and 2, the apparatus 10 generaly includes a detector 15 disposed at the upstream side of a path of movement of the chain of elongate products 11 (hereinafter referred to as "chain") for detecting the joint portions 13 of the chain 11, an intermittently operative feed unit 16 disposed downstream of the detector 15 for intermittently feeding the chain 11 longitudinally along the path, a cutting unit 17 disposed downstream of the feed unit 16 for cutting the chain 11 into pieces 12 of the desired length 1, a container 18 disposed below the cutting unit 17 for receiving the severed pieces 12 therein, and a reciprocative container unit 19 disposed adjacent to the cutting unit 17 for receiving threin severed pieces 12a (FIG. 3D) including the joint portions 13. Between the detector 15 and the feed unit 16, there is provided a guide roller 20 for guiding therearound the chain 11. The chain 11, as it passes around the guide roller 20, changes its direction of movement from a horizontal direction to a vertically downward direction.

Figure 6:
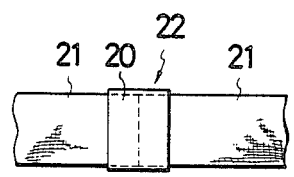
FIG. 6 is a fragmentary plan view of another joint portion including a light-reflective adhesive tape joining two adjacent elongate products.

The detector 15 is so constructed as to suit with the properties of the joint portions to be detected by the detector 15. Accordingly, for use with the chain 11 having metallic staples 13 in the point portions 12 as shown in FIGS. 3A–3D, the detector 15 preferably comprises a metal detector. In case a light-reflective adhesive tape 21 is used to join each adjacent pair of the elongate products 22, 22 as shown in FIG. 6, a reflective-type photoelectric detector will be employed. The detector 15 is disposed in confronting relation to one surface of the chain 11 and produces one signal pulse each time the joint portion 13 of each adjacent pair of the elongate products 11 arrives at the detector 15.

Figure 3A:
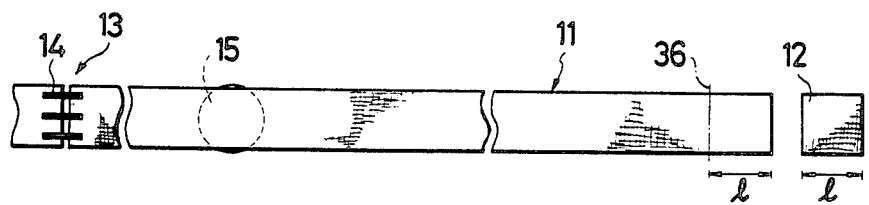
FIGS. 3A through 3D are schematic plan views illustrative of the manner in which the chain is severed into successive pieces of a desired length.
Figure 3B:
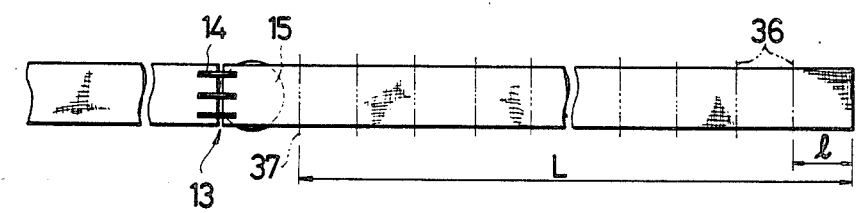
Figure 3C:
Figure 3D:
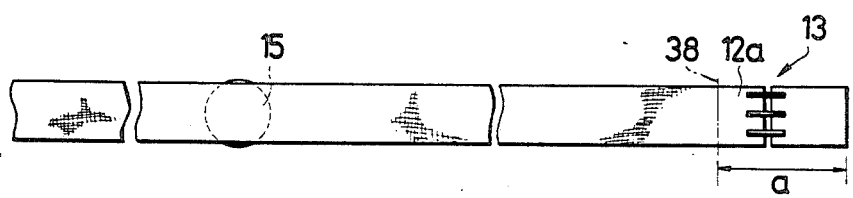
Figure 4:
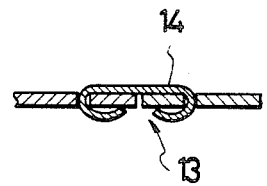
FIG. 4 is an enlarged cross-sectional view of a joint portion including a staple interconnecting two adjacent elongate products.

The feed unit 16 includes a drive roller 24 and a presser roller 25 pressed against the drive roller 24. The drive roller 24 is connected with a suitable drive means such as an electric stepper motor 26 and is driven by the latter to rotate through an angle for advancing the chain 11 stepwise along the path. The stepper motor 26 and hence the feed unit 16 is selectively operative in a first mode in which the chain 11 is advanced stepwise by a distance equal to the desired length 1 of pieces 12 to be severed, or in a second mode in which the chain 11 is advanced by a distance equal to the length of the pieces 12a having the joint portions 13 (FIG. 3D). The presser roller 25 is rotatably mounted on one end of a support lever 27 pivatably movable about a pin 28. A tension coil spring 29 is connected at one end with the other end of the support lever 27 to turn the latter about the pin 28 in the clockwise direction (FIG. 1), thereby urging the presser roller 25 against the drive roller 24. With the drive and presser rollers 24, 25 thus constructed, the chain 11 is positively intermittently advanced accurately by the distance 1 or a. The stepper motor 26 may be replaced by another intermittent drive means such as a hydraulic stepper motor, or a crank-and-cam mechanism. As the joint portions 13 of the chain 11 are relatively unstable and likely to be deformed during advancing movement of the chain 11, it is preferable to locate the drive and presser rollers 24, 24 close to the cutting unit 17, thereby ensuring a clean and accurate severance of the pieces 12a including such unstable joint portions 13.

The cutting unit 17 includes a cooperative pair of blades 30, 31 disposed on opposite sides of the path. One of the blades 30 is immovable and the other blade 31 is reciprocably movable toward and away from the stationary blade 30. For reciprocating movement, the movable blade 31 is connected in driven relation to an actuator 32 such as an air cylinder, a hydraulic cylinder or a solenoid.

The container 18 is stationary while a container 33 of the container unit 19 is horizontally reciprocably movable between a standby position (solid lines in FIG. 2) which is displaced off the path in an upwardly leftward direction of the stationary container 18, and a working position (phantom lines in FIG. 2) which is located between the cutting unit 17 and the stationary container 18. The container 33 is normally held in the standby position and is driven by a suitable actuator 34 such as a fluid-actuated cylinder, to move toward the working position.

As shown in FIG. 2, the apparatus 10 also includes a control unit 35 electrically connected with the detector 15, the stepper motor 26 (FIG. 1) of the feeding unit 16, the actuator 32 of the cutting unit 17 and the actuator 34 of the container unit 19, for controlling the operation of the units 16, 17, 19 in response to the detection of the joint portions 13 of the chain 11. Preferably, the control unit 35 is of the type which includes a counter circuit (not shown) having a count register which is electrically resettable. The count register is set to a predetermined figure and, after the receipt of the signal pulse from the detector 15 and in response to operation of the feed unit 16, the registered figure is counted down to zero at which time an output signal is produced. The registered figure is essentially determined by the distance between the detector 15 and the cutting unit 17 devided by the length 1 of the pieces 12. Instead of the counter circuit, the control unit 35 may have a speed controller or a timer which is linked with the detector 15 and the units 16, 17, 19 to control the operation of the units 16, 17, 19 in such a manner as described blow.

In operation, as the feed unit 16 is intermittently energized, the chain 11 is advanced stepwise by a distance which is equal to the length 1 (FIG. 3A) of pieces 12 to be severed. While the feed unit 16 is inoperative, the cutting unit 17 is driven to sever the chain 11 along a transverse line 36 of severance with the result that pieces 12 of the desired length 1 are produced one at a time. The severed pieces 12 fall into the stationary container 18. Continuing such synchronous operation of the feed unit 16 and the cutting unit 17 causes one joint portion 13 to arrive at the detector 15 as shown in FIG. 3B whereupon the detector 15 issue a signal pulse to the control unit 35. Upon receipt of the signal pulse, the control unit 35 computes the total number of prospective pieces 12 of the desired length 1 producible from a longitudinal portion L of the chain 11 which extends from the leading end of the chain 11 and terminates short of the detected joint portion 13. The aforesaid synchronous feeding and cutting operation is repeated until the computed number of pieces 12 have been severed (see a line 37 of severance in FIG. 3C) whereupon the control unit 35 issue a first output signal to the feed unit 16 to shift the operation of the feed unit 16 from the first mode to the second mode. The first output signal is also delivered to the actuator 34 to move the container 33 from the standby position to the working position immediately below the cutting unit 17. With the next stepwise operation of the feed unit 16, the chain 11 advances through the distance a (FIG. 3D) so that the detected joint portion 13 is located downstream of the cutting unit 17. Then the cutting unit 17 is operated to cut the chain along a line 38 of severance, thereby producing a piece 12a having the detected joint portion 13. The severed piece 12a fall into the container 33. Upon completion of cutting of the piece 12a, the control unit 35 issues a second output signal to the feed unit 12 so as to to shift the operation of the same from the second mode to the first mode. The second output signal is also sent to the actuator 34 of the container unit 19 to return the container 33 from the working position to the standby position. The feeding unit 16 and the cutting unit 16 then resume their synchronous operation to thereby cut the chain 11 into the pieces 12 of the desired length 1.

Figure 5:
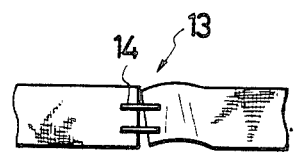
FIG. 5 is a fragmenrary plan view of an example of a deformed joint portion of the chain.
Figure 7:
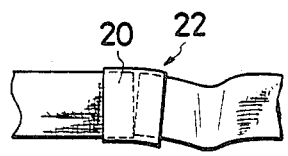
FIG. 7 is a view similar to FIG. 6 with the joint portion deformed undesirably.

The length a of the pieces 12a varies with the length 1 of the pieces 12, however, in view of the tendency of the chain 11 toward the deformation at the joint portions 13 as shown in FIGS. 5 and 7, it is preferable to determine the lenngth a to such an extent that all the pieces 12 have transverse severed edges even though the joint portions 13 are deformed or become wavy.

As described above, the operation of the feed unit 16, cutting unit 17 and the container unit 19 is automatically controlled to effect successive severance of the pieces 12 of the desired length 1 without interruption when the joint portions 13 are detected. The joint portions 13 are automatically cut off from the chain 11 and then separated from the pieces 12 of the desired length 1. With the arragement of the present invention, an effective cutting off of the pieces 12 of the desired length from the chain of longitudinally connected elongate products 11 is attained.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A method of cutting a continuous chain of longitudinally joined elongate products into pieces of a desired length, the chain having longitudinally spaced successive joint portions, said method comprising the steps of:
   (a) feeding the chain of elongate products intermittently by a first distance equal to the length of each piece to be severed, along a path through a detecting station and a cutting station downstream of the detecting station;
   (b) cutting the chain successively into pieces of the desired length at the cutting station while the chain is at rest;
   (c) during said feeding, detecting the joint portion of each adjacent pair of the elongate products at the detecting station;
   (d) in response to said detecting, computing the number of prospective pieces of the desired length producible by severing from a longitudinal portion of the chain which extends from the present leading end of the chain toward the detected joint portion and terminates short of the detected joint portion;
   (e) repeating said feeding and said cutting until the computed number of pieces have been severed;
   (f) thereafter, feeding the chain forwardly by a second distance until the detected joint portion is located downstream of the cutting station;
   (g) cutting the chain to produce a severed a piece including the detected joint portion; and
   (h) removing the last-named severed piece.

2. A method according to claim 1, said feeding of the chain being achieved by an intermittently operative feed unit selectively operative in a first mode to advance the chain by the first distance or in a second mode to advance the chain in the second distance.

3. A method according to claim 1, said removing of the piece including the joint portion being achieved by allowing the piece to fall into a container reciprocably movable between a working position to receive the piece and a standby position remote from the working position.

4. An apparatus for cutting a continuous chain of longitudinally joined elongate products into pieces of a desired length, the chain having longitudinally spaced successive joint portions, said apparatus comprising:
   (a) an intermittently operative feed unit for feeding the chain of elongate products along a path, said feed unit being selectively operative in a first mode in which the chain is fed by a first distance equal to the desired length of each pieces to be severed, or in a second mode in which the chain is fed by a second distance equal to the length of each piece having one joint portion;
   (b) a cutting unit disposed on the path downstream of said feed unit for cutting the chain into severed pieces of the desired length while said feed unit is inoperative;
   (c) a detector disposed on the path upstream of said cutting unit for producing a signal pulse each time the joint portion between each adjacent pair of the elongate products arrives at said detector;
   (d) a control unit electrically connected with said detector, said feed unit and said cutting unit for, upon receipt of one signal pulse from said detector, computing the number of prospective pieces of the desired length producible by cutting the chain from a longitudinal portion of the chain which extends from the present leading end of the chain toward the detected joint portion and terminates short of the detected joint portion, and for producing a first output signal when the computed number of pieces have been severed by said cutting unit to shift the operation of said feed unit from said first mode to said second mode, thereby advancing the detected joint portion forwardly beyond said cutting unit, and also for producing a second output signal, when the next following cutting has completed to produce a severed piece including the detected joint portion, to shift the operation of said feed unit from said second mode to said first mode; and
   (e) a reciprocably movable container unit electrically connected to said control unit for receiving the last-named severed pieces including the joint portion, said container unit including a container moved between a working position to receive the severed pieces and a standby position remote from the working position.

5. An apparatus according to claim 4, for use with the joint portion including at least one staple of metal, said detector comprising a metal detector.

6. An apparatus according to claim 4, for use with the joint portion including at least a light-reflective adhesive tape, said detector comprising a reflective-type photoelectric detector.

7. An apparatus according to claim 4, said feed unit being disposed close to said cutting unit.

8. An apparatus according to claim 4, further including a stationary container disposed below said cutting unit for recieving the severed pieces of the desired length.

* * * * *